US008682528B2

(12) United States Patent
Contratto et al.

(10) Patent No.: US 8,682,528 B2
(45) Date of Patent: Mar. 25, 2014

(54) SEAT SUSPENSION SYSTEM HAVING FAIL-SAFE FUNCTIONALITY

(75) Inventors: Michael S. Contratto, Chillicothe, IL (US); John C. Spangler, Jr., Pekin, IL (US); Charles E. Lewis, II, Normal, IL (US); Florin M. Marcu, Dunlap, IL (US); Kristen A. Gerstner, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 10 days.

(21) Appl. No.: 13/448,943

(22) Filed: Apr. 17, 2012

(65) Prior Publication Data

US 2013/0158791 A1 Jun. 20, 2013

Related U.S. Application Data

(60) Provisional application No. 61/578,074, filed on Dec. 20, 2011.

(51) Int. Cl.
| | | |
|---|---|---|
| *G06F 7/00* | (2006.01) | |
| *B60R 22/00* | (2006.01) | |
| *E05F 15/00* | (2006.01) | |
| *G05D 1/00* | (2006.01) | |
| *G05D 3/00* | (2006.01) | |
| *G06F 17/00* | (2006.01) | |
| *G08B 21/00* | (2006.01) | |

(52) U.S. Cl.
USPC .............................. 701/36; 701/49; 340/667

(58) Field of Classification Search
USPC ............ 701/36, 49, 50; 340/667; 297/344.16
See application file for complete search history.

(56) References Cited

U.S. PATENT DOCUMENTS 3,687,481 A * 8/1972 Graef .......................... 280/6.159
4,363,377 A   12/1982 Van Gerpen
4,469,010 A *  9/1984 Skover et al. ................... 91/408

(Continued)

FOREIGN PATENT DOCUMENTS

| KR | 100326369 | 8/2002 |
|---|---|---|
| WO | 2006134417 | 12/2006 |
| WO | 2009125262 | 10/2009 |

OTHER PUBLICATIONS

U.S. Patent Application of Michael S. Contratto et al. entitled "Adaptive Seat Suspension System" filed on Apr. 17, 2012.

(Continued)

*Primary Examiner* — Fadey Jabr
*Assistant Examiner* — Paula L Schneider
(74) *Attorney, Agent, or Firm* — Finnegan, Henderson, Farabow, Garrett & Dunner LLP (57) ABSTRACT

A suspension system for a mobile machine is disclosed. The suspension system may have a seat operatively connected to a cabin floor of the mobile machine, a cylinder connected between the seat and the cabin floor, and a spring associated with the cylinder. The suspension system may also have at least one valve configured to regulate fluid flow into and out of the cylinder, and a controller in communication with the at least one valve. The controller may be configured to detect a failure condition of the suspension system. In response to detection of the failure condition, the controller may be further configured to cause the at least one valve to move to a default position at which fluid flow into and out of the cylinder is restricted by an amount that still allows fluid flow through the at least one valve.

15 Claims, 5 Drawing Sheets

(56) References Cited

U.S. PATENT DOCUMENTS

| | | | |
|---|---|---|---|
| 5,652,704 A | 7/1997 | Catanzarite | |
| 6,082,715 A | 7/2000 | Vandermolen | |
| 6,120,082 A | 9/2000 | Vandermolen | |
| 6,193,297 B1 | 2/2001 | Vandermolen | |
| 6,467,748 B1 | 10/2002 | Schick et al. | |
| 6,694,856 B1* | 2/2004 | Chen et al. | 89/43.01 |
| 6,886,650 B2* | 5/2005 | Bremner | 180/89.13 |
| 6,904,344 B2* | 6/2005 | LaPlante et al. | 701/37 |
| 6,974,000 B2* | 12/2005 | Carlson et al. | 188/267.2 |
| 7,032,703 B2* | 4/2006 | Wulfert et al. | 180/329 |
| 7,206,681 B2 | 4/2007 | Casey et al. | |
| 7,822,522 B2* | 10/2010 | Wereley et al. | 701/45 |
| 7,866,606 B2 | 1/2011 | Peck | |
| 2003/0196616 A1* | 10/2003 | Simpson | 123/90.15 |
| 2003/0230447 A1 | 12/2003 | Wulfert et al. | |
| 2006/0095180 A1* | 5/2006 | Ummethala et al. | 701/37 |
| 2010/0052356 A1 | 3/2010 | Lewis, II | |
| 2010/0147640 A1 | 6/2010 | Jones et al. | |
| 2010/0152968 A1 | 6/2010 | Jones et al. | |
| 2010/0152978 A1 | 6/2010 | Jones et al. | |
| 2010/0152979 A1 | 6/2010 | Jones et al. | |
| 2010/0152980 A1 | 6/2010 | Jones et al. | |
| 2010/0161182 A1 | 6/2010 | Contratto et al. | |
| 2010/0179730 A1* | 7/2010 | Hiemenz et al. | 701/45 |
| 2010/0332079 A1* | 12/2010 | Wang et al. | 701/37 |
| 2012/0186922 A1* | 7/2012 | Battlogg et al. | 188/267.1 |

OTHER PUBLICATIONS

Article entitled "Tip the Load Fantastic" published in iVTInternational.com (Sep. 2011).

* cited by examiner

SEAT SUSPENSION SYSTEM HAVING FAIL-SAFE FUNCTIONALITY

RELATED APPLICATIONS

This application is based on and claims the benefit of priority from U.S. Provisional Application No. 61/578,074 by Michael S. CONTRATTO et al., filed Dec. 20, 2011, the contents of which are expressly incorporated herein by reference.

TECHNICAL FIELD

The present disclosure is directed to a suspension system and, more particularly, to a seat suspension system for a mobile machine that has fail-safe functionality.

BACKGROUND

Mobile machines, such as scrapers, dozers, motor graders, haul trucks, and wheel loaders often operate in extreme environments, where the machines encounter shock-loading and vibration introduced by the vehicle itself and by external inputs, such as uneven terrain at a worksite. Operators of the machines are exposed to these conditions, which can cause discomfort and increase a difficulty of controlling the machines. In order to improve operator comfort and machine control, machines sometimes employ suspension systems that help isolate the operator from machine movements.

Typical suspension systems include a spring to support the operator's seat, and a damper to control resonant motion of the seat. An exemplary suspension system is disclosed in U.S. Patent Publication 2010/0161182 of Contratto et al. that published on Jun. 24, 2010 ("the '182 publication"). In particular, the '182 publication discloses a vibration control system for a seat having a cylinder that is filled with air via an electromechanical valve. The cylinder is connected between the seat and a base that mounts to a floor of a machine cab. The vibration control system also includes a spring that couples the seat to the base. In response to an initial vibration, acceleration, or excursion of the seat caused by the associated machine or external input, movement of the valve is regulated to control an amount of air within the cylinder and thereby dampen displacement of the seat.

Although the control system of the '182 publication may help to isolate an operator from machine movement during normal operations through active dampening of a seat, it may still be less than optimal. In particular, the control system may not disclose any fail-safe functionality. That is, when power to the electromechanical valve is lost in conventional seat dampening systems, one of two things generally occurs. First, the electro-mechanical valve is completely opened such that the cylinder is rendered useless, thereby preventing any resonant cushioning to the operator. Alternatively, the electro-mechanical valve is completely closed such that the cylinder becomes sealed off from the environment, thereby making the seat completely rigid and providing no cushioning at all for the operator. The control system of the '182 does not describe a way of addressing these problems.

The present disclosure is directed to overcoming one or more of the problems set forth above and/or other problems of the prior art.

SUMMARY

One aspect of the present disclosure is directed to a suspension system for a mobile machine. The seat suspension system may include a seat operatively connected to a cabin floor of the mobile machine, a cylinder connected between the seat and the cabin floor, and a spring associated with the cylinder. The suspension system may also include at least one valve configured to regulate fluid flow into and out of the cylinder, and a controller in communication with the at least one valve. The controller may be configured to detect a failure condition of the suspension system. In response to detection of the failure condition, the controller may be further configured to cause the at least one valve to move to a default position at which fluid flow into and out of the cylinder is restricted by an amount that still allows fluid flow through the at least one valve.

Another aspect of the present disclosure is directed to a seat dampening method for a mobile machine. The seat dampening method may include pressurizing fluid, and selectively directing the pressurized fluid into and out of a cylinder associated with an operator seat to dampen movement of the seat. The method may further include detecting a failure condition of the mobile machine, and restricting fluid flow into and out of the cylinder by an amount that still allows fluid flow into and out of the cylinder during the failure condition.

Yet another aspect of the present disclosure is directed to another seat suspension system. This seat suspension system may include a seat operatively connected to a cabin floor of the machine, a cylinder connected between the seat and the cabin floor, a spring associated with the cylinder, and at least one valve configured to regulate fluid flow into and out of the cylinder. The seat suspension system may further include the at least one valve having a valve element that is movable from an active position at which fluid flow is substantially unrestricted by the at least one valve, toward a default position at which fluid flow through the at least one valve is restricted by an amount that still allows fluid flow through the at least one valve. The at least one valve may be biased toward the default position and selectively moved to the active position.

DETAILED DESCRIPTION

Figure 1:
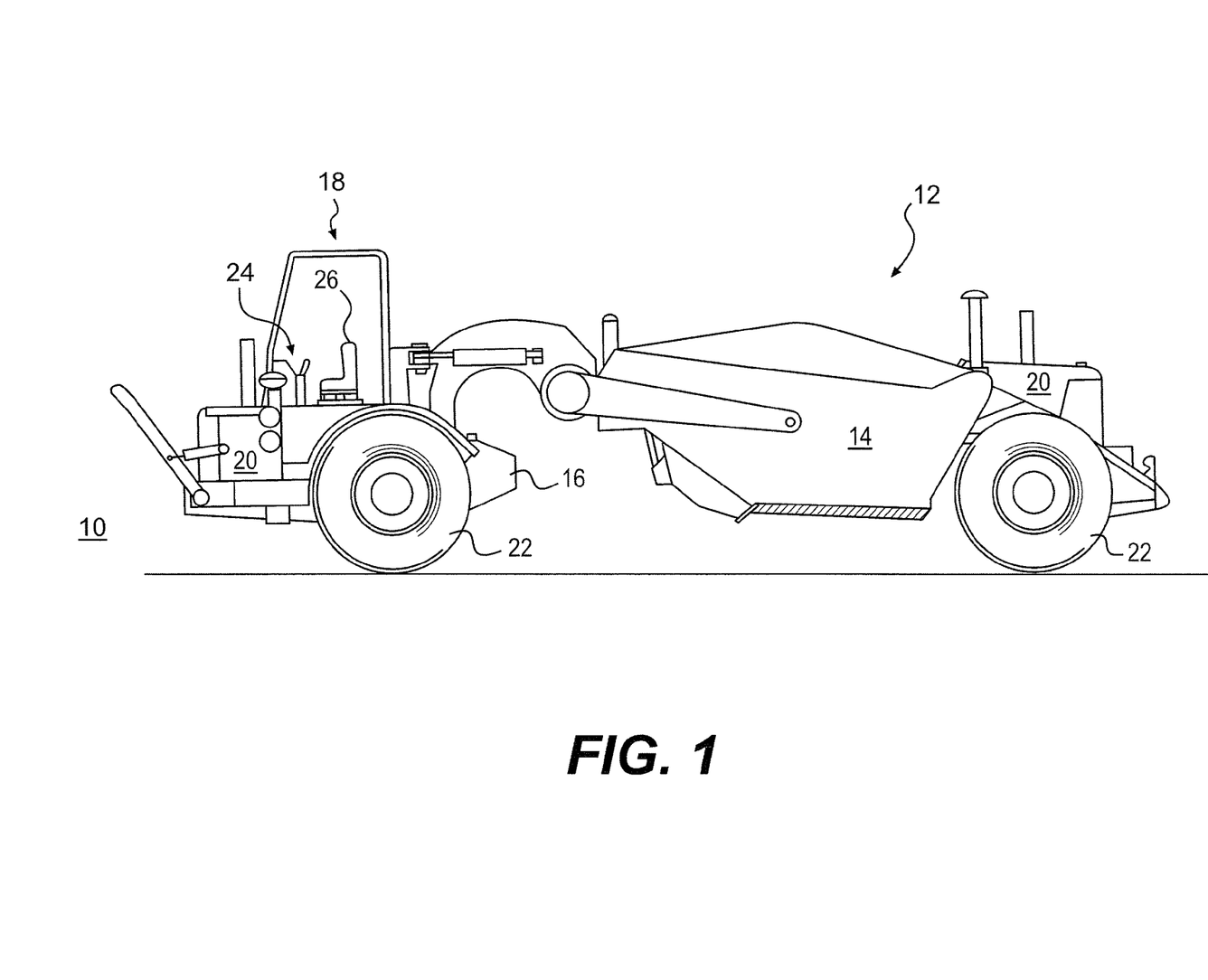
FIG. 1 is a diagrammatic illustration of an exemplary disclosed mobile machine.

FIG. 1 illustrates a worksite 10 with an exemplary mobile machine 12 performing a particular operation associated with an industry such as mining, construction, farming, or another industry known in the art. Worksite 10 may include, for example, a mine site, a landfill, a quarry, a construction site, a farm, or any other type of worksite, and the particular operation may be associated with altering the current geography at worksite 10. Exemplary operations may include, among others, roading (i.e., traveling at relatively high speeds on a developed roadway), backing-up, forward tool use (e.g., dozing, ripping, or scraping), truck loading, digging, and dumping.

Machine 12 may be any type of mobile machine known in the art, and generally equipped with a work tool 14. For example, machine 12 could be a wheeled tractor scraper (shown in FIG. 1), an excavator, a loader, a dozer, or a haul truck, among others. Machine 12 may include a frame 16 that at least partially defines and supports an operator cabin 18, one or more engines 20, and work tool 14. Engines 20 may generate a power output directed to one or more traction devices 22 that support frame 16 and propel machine 12, and to work tool 14.

Numerous different work tools 14 can be attached to a single machine 12 and controllable via operator cabin 18. Work tool 14 may include any device used to perform a particular operation such as, for example, a bowl, a bucket, a blade, a shovel, a ripper, a dump bed, or any other task-performing device known in the art. Work tool 14 may be connected to work machine 12 via a direct pivot, via a linkage system, via one or more hydraulic and/or electric power lines, via an actuator, or in any other appropriate manner. Work tool 14 may be configured to pivot, rotate, slide, swing, lift, or move relative to work machine 12 in any manner known in the art.

Operator cabin 18 may be configured to receive input from a machine operator indicative of a desired movement of machine 12 (e.g., of work tool 14 and/or traction devices 22) and generate corresponding signals. Specifically, operator cabin 18 may include any number of operator input devices 24 located adjacent an operator's seat 26. Operator input devices 24 may generally be proportional-type controllers used to position and/or orient machine 12 or work tool 14 and configured to produce one or more interface device position signals indicative of desired operations. It is contemplated that operator input devices 24 may embody any type of devices known in the art such as, for example, joysticks, wheels, knobs, push-pull devices, switches, and pedals.

Figure 2:
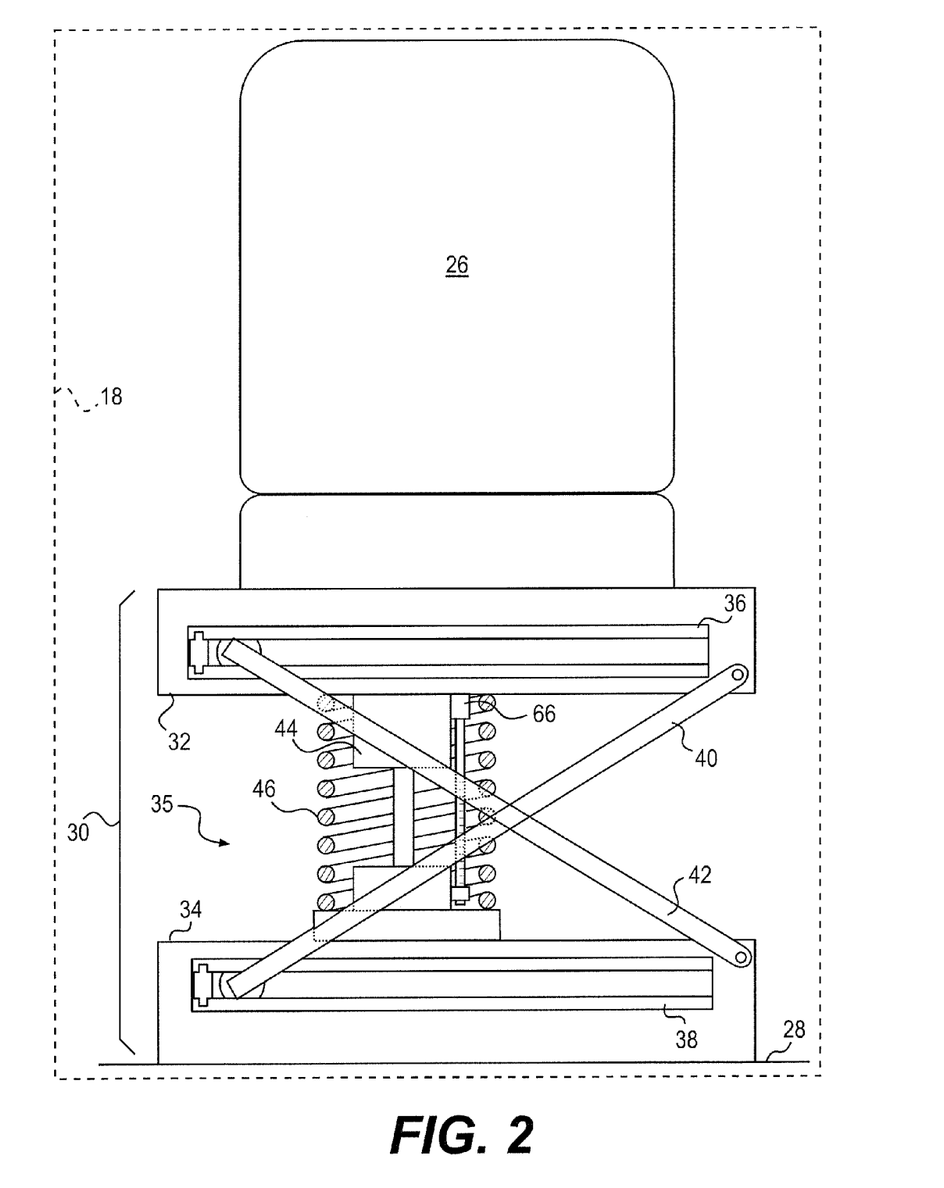
FIG. 2 is a diagrammatic illustration of an exemplary disclosed seat that may be used within the mobile machine of FIG. 1.

As shown in FIG. 2, seat 26 may be operatively connected to a floor 28 of operator cabin 18 by way of a suspension system 30. Suspension system 30 may include, among other things, a support 32 fixedly connected to seat 26, a base 34 fixedly connected to floor 28, and one or more damper mechanisms 35 disposed between and separating support 32 and base 34. Support 32 and base 34 may be connected to each other by way of linkage that allows for generally vertical travel of support 32 relative to base 34. In the disclosed example, the linkage includes travel rails 36, 38 that are connected to each of support 32 and base 34, respectively, and travel guides 40, 42 that extend between travel rails 36, 38. Travel guide 40 may be pivotally engaged at a first end with support 32 and slidingly engaged at an opposing second with travel rail 38 of base 34, while travel guide 42 may be pivotally engaged at a first end with base 34 and slidingly engaged at an opposing second end with travel rail 36 of support 32. When machine 12 experiences vibrations or movements, support 32 and base 34 may move relative to each other as the second ends of travel guides 40, 42 slide within travel rails 36, 38, respectively. Although not shown in FIG. 2, a similar arrangement of travel guides and travel rails may be associated with both a front and a rear side of seat 26. Other arrangements (e.g., toggle and/or rotational members) for physically guiding movement of seat 26 may alternatively be used, if desired.

Damper mechanism 35 may include components that cooperate to isolate seat 26 somewhat from movements and vibrations of floor 28 to which seat 26 is connected. In the disclosed exemplary embodiment, these components include a cylinder 44 and a spring 46 (e.g., a mechanical or fluid type of spring) associated with (e.g., disposed around or adjacent) cylinder 44. It is contemplated that other or additional components may be included within damper mechanism 35, if desired. Spring 46 may provide a constant or variable force biasing support 32 away from base 34, while cylinder 44 may be controlled to reduce resonant oscillations of seat 26.

Cylinder 44 may include a tube 56 and a piston assembly 58 (or other load bearing member) disposed within tube 56. One of tube 56 and piston assembly 58 may be connected to base 34 (referring to FIG. 2), while the other of tube 56 and piston assembly 58 may be connected to support 32. Tube 56 may be separated by piston assembly 58 to at least partially define a head chamber 60 and a rod chamber 62. Head and/or rod chambers 60, 62 may be selectively supplied with pressurized fluid (e.g., oil, air, or another compressible or incompressible fluid) and selectively drained of the pressurized fluid to cause piston assembly 58 to displace within tube 56, thereby changing an effective length of cylinder 44. The expansion and retraction of cylinder 44 may function to assist in moving (i.e., lowering or raising) a height of seat 26. In addition, the pressure of the fluid within one or both of head and rod chambers 60, 62, combined with surface areas of piston assembly 58 exposed to the pressurized fluid, may determine a force exerted by cylinder 44 that cushions movement of seat 26.

Figure 3:
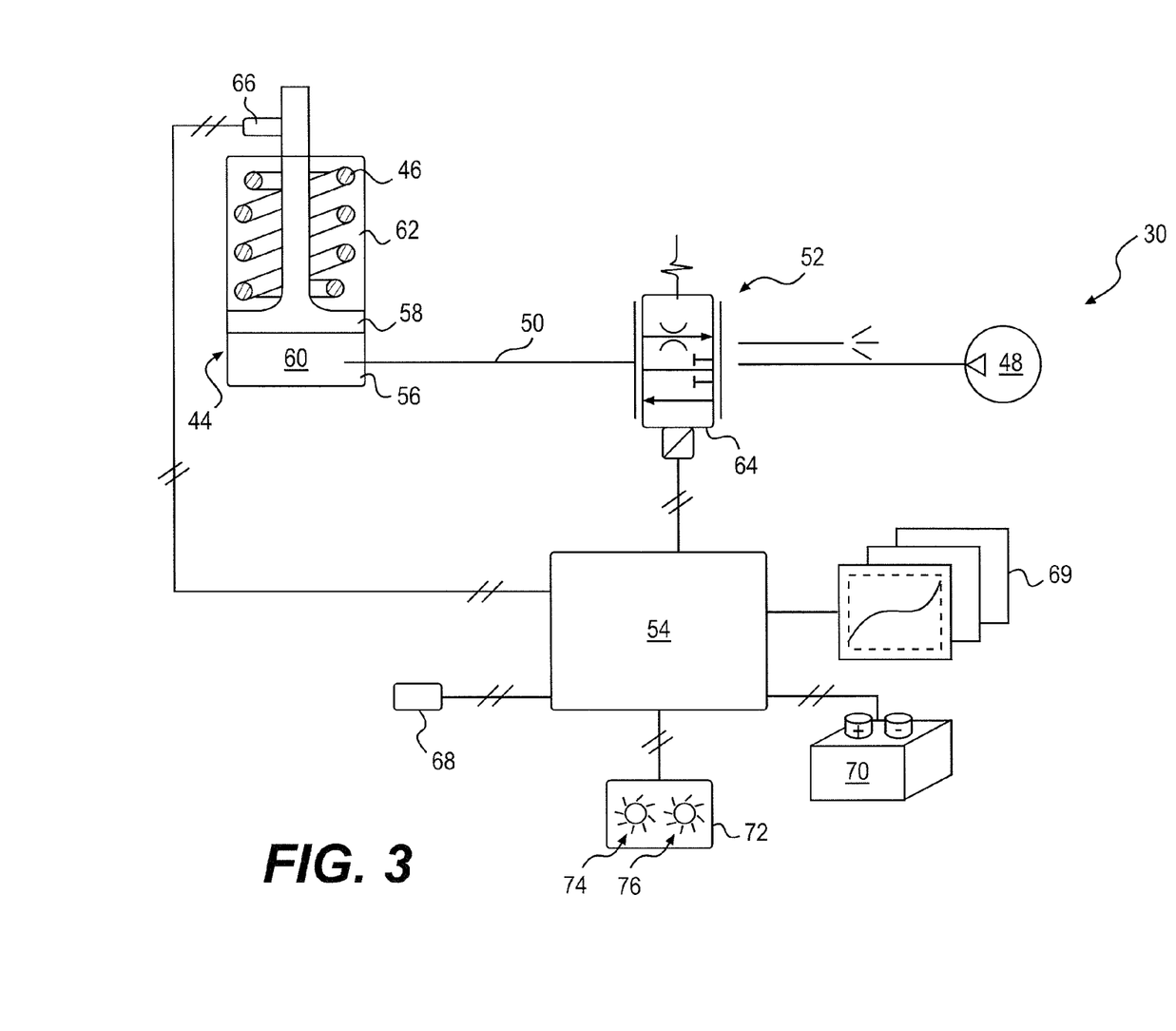
FIG. 3 is a schematic illustration of an exemplary disclosed suspension system that may be utilized in conjunction with the seat of FIG. 2.

As shown in FIG. 3, suspension system 30 may include additional components used to regulate operation (e.g., movement, force, and/or position) of cylinder 44. In particular, suspension system 30 may include a source 48 of pressurized fluid connected to head chamber 60 of cylinder 44 via a passage 50, a control valve 52 disposed within passage 50, and a controller 54 in communication with control valve 52. In response to various input (as will be described in more detail below), controller 54 may issue commands to control valve 52 to open or close, thereby allowing desired amounts of pressurized fluid to flow from source 48 into or out of head chamber 60 at desired rates. This flow of pressurized fluid into or out of cylinder 44 may function to move (i.e., extend or retract) cylinder 44 with a force based at least partially on a pressure of the fluid and a restriction placed by control valve 52 on movement of the fluid through passage 50.

Although not shown, it is contemplated that suspension system 30 may alternatively include a closed-loop circuit associated with cylinder 44, if desired. In particular, it may be possible to directly connect head chamber 60 with rod chamber 62 via control valve 52 and passage 50. In this arrangement, source 48 may be omitted and control valve 52 may be utilized to regulate fluid flow only between head and rod chambers 60, 62. That is, no significant amount of fluid may be supplied into or drained from suspension system 30, if desired. Controller 54, in similar manner as described above, may issue commands to control valve 52 to open and close by desired amounts, thereby allowing a desired rate of fluid to flow between head and rod chambers 60, 62. This desired flow rate may correspond with a desired amount of dampening of cylinder movement.

Source 48 may be any type of fluid source known in the art, for example a pump, an accumulator, a storage tank, or a combination thereof. Source 48 may be configured to pressurize and/or store the fluid at elevated pressures. In the disclosed exemplary embodiment, source 48 is a pump that is driven by engine 20 (referring to FIG. 1) to draw in low-pressure fluid (e.g., oil or air from the atmosphere), pressurize the fluid, and discharge fluid at elevated pressures into passage 50. In this embodiment, source 48 may be a fixed-displacement/fixed-delivery type of pump configured to pressurize a relatively constant rate of fluid to a relatively constant level for usage by cylinder 44. In some arrangements, however, source 48 may pressurize fluid at a variable rate and/or to a variable level, and supply the pressurized fluid to additional components of machine 12 (e.g., to one or more brakes associated with traction devices 22, to actuators of tool 14, and/or to other components of machine 12).

Control valve 52 may have one or more elements movable between different positions to affect movement of cylinder 44 and a force applied by cylinder 44 on seat 26 via support 32. In the disclosed exemplary embodiment, control valve 52 (shown in FIG. 3) has a single valve element 64 moveable to any position between a first more-restrictive position and a second less-restrictive active position. When valve element 64 is in the first position, a restriction may be placed on the flow of fluid passing through control valve 52. It should be noted, however, that even this restriction, some flow of fluid may still be allowed to pass through control valve 52, thereby allowing some movement (albeit very slow or dampened movement) of cylinder 44 and a corresponding movement of seat 26. When valve element 64 is in the second position, very little or no restriction may be placed by control valve 52 on the flow of fluid within passage 50. In this position, a quicker or undampened movement of cylinder 44 and seat 26 may be possible. Valve element 64 may be biased to a position between the first and second position (e.g., a default position), and selectively moved toward the first or second position when energized (i.e., when controller 54 directs a current or otherwise issues a command to control valve 52).

Controller 54 may be a single microprocessor or multiple microprocessors that include a means for controlling an operation of suspension system 30. Numerous commercially available microprocessors can be configured to perform the functions of controller 54. It should be appreciated that controller 54 could readily be embodied in a general machine microprocessor capable of controlling numerous engine, tool, and/or machine functions. Controller 54 may include a memory, a secondary storage device, a processor, and any other components for running an application. Various other circuits may be associated with controller 54 such as power supply circuitry, signal conditioning circuitry, solenoid driver circuitry, and other types of circuitry.

Controller 54 may rely on input from one or more sensors during regulation of control valve 52. In the disclosed exemplary embodiment, controller 54 may rely on at least one seat sensor 66 and at least one machine sensor 68, although any number and types of sensors may be utilized. Seat sensor 66 may embody, for example, a position sensor, a speed sensor, a velocity sensor, an acceleration sensor, a pressure sensor, another type of sensor, and/or a combination thereof.

Machine sensor 68 may embody, among others, a tool sensor, a travel sensor, a position sensor, an operator input sensor, or a combination thereof. For example, machine sensor 68 may be associated with tool 14 and configured to monitor activation of tool 14 such as a position, a velocity, a force, an acceleration, a load, and/or a configuration of tool 14, and responsively generate a corresponding signal directed to controller 54. In another example, machine sensor 68 may be associated with a drive train (e.g., a rotating member such as an axle or wheel, a transmission, engine 20, or another component), with a tracking system (not shown), or with another component or system of machine 12 and be configured to monitor a travel direction, a travel speed, a fore/aft or side-to-side acceleration, a yaw rate, a pitch rate, a roll rate, a position, a transmission gear ratio, an engine speed, or other similar performance parameter of machine 12, and generate corresponding machine signals directed to controller 54. In yet another example, machine sensor 68 may be associated with input devices 24 located within operator cabin 18 and be configured to generate signals directed to controller 54 corresponding to input (e.g., frequency, magnitude, speed, and/or patterns of input) received from the operator of machine 12.

Controller 54 may be configured to classify a current operation of machine 12 into one or more known categories and/or as one or more types of operations based on signals received from machine sensor(s) 68. Specifically, based on signals from machine sensor(s) 68, controller 54 may be configured to classify the current operation of machine 12 as a first type of operation, a second type of operation, a third type of operation, etc.

For example, during a first operation, controller 54 may receive signals from machine sensor(s) 68 indicating a relatively high gear ratio of the transmission, a relatively high speed of engine 20 and/or traction devices 22, minimal use of work tool 14, a position of machine 12 on a known roadway, or other similar parameter and, based on these parameters, classify the current operation as one of the first types of operation. An exemplary first type of operation may be a roading operation. In another example, during a different second operation, controller 54 may receive signals from machine sensor(s) 68 indicating a relatively low forward gear ratio of the transmission, a heavy load on work tool 14, a tool configuration having a dozing blade, a position of machine 12 at a dozing location, or another similar parameter and, based on these parameters, classify the current operation as one of the second types of operations. An exemplary second type of operation may be a forward dozing operation. In a final example, during a third operation, controller 54 may receive signals from machine sensor(s) 68 of cyclical movements of tool 14 through about a 90 degree angle (or a corresponding pattern of inputs from the operator within cabin 18) with alternating high and low loading and, based on these signals, classify the current operation as one of the third types of operations. An exemplary third type of operation may be a truck loading operation. Other exemplary operations may include a backing-up operation, another forward tool use operation (e.g., ripping), a digging operation, a dumping operation, or another similar operation. Each of these operations, based on one or more predefined classification criteria, may be considered the first type of operation, the second type of operation, the third type of operation, or another type of operation.

Using the classification of the current operation of machine 12, controller 54 may then be configured to select at least one map 69 from a plurality of available control maps stored within memory for use in controlling operations of suspension system 30 (e.g., for use in controlling a height of seat 26, a position of valve element 64, a pressure of the fluid discharged from source 48, a volume of source 48, and/or other similar parameters). For example, controller 54 may include at least one map 69 for each of the different classifiable operations of machine 12. These maps 69 may be in the form of tables, graphs, algorithms, and/or equations, and each be configured to relate in different manners the signals from seat sensor(s) 66 with specific operational commands subsequently issued by controller 54 to suspension system 30 (e.g., to control valve 52). For example, based on classification of the current machine operation as a roading operation, controller 54 may select a roading control map 69 that, in general, generates commands providing for decreased dampening of seat movements to enhance operator comfort during long travel periods. In another example, based on classification of the current machine operation as a dozing operation, controller 54 may select for use a dozing control map 69 that, in general, generates commands providing for increased dampening of seat movements to enhance operator feel and/or control of dozing blade behavior. Controller 54 may then be configured to issue commands to suspension system 30, based on the selected control map 69 and based on the signals from seat sensor(s) 66, thereby causing a level of dampening desired and/or optimal for a particular operation. Additionally or alternatively, a height of seat 26 may be adjusted based on the selected control map 69 (i.e., based on the classified operation) and/or the signals from seat sensor(s) 66, if desired. The seat height may be adjusted automatically based on the classified operation or, alternatively, instructions to adjust the seat height may be provided based on the classified operation, as desired. It is contemplated that controller 54 may be further configured to allow an operator of machine 12 to directly modify these maps 69 and/or to select specific maps 69 from available relationship maps stored in the memory of controller 54 to affect operation of suspension system 30.

Suspension system 30 may have fail-safe functionality. In particular, it may be possible for suspension system 30 to lose power during machine operation. In these situations, because of the configuration of control valve 52 (i.e., because valve element 64 may be biased toward the default position described above), movement of seat 26 may still continue to be dampened. That is, upon loss of power (e.g., from a power source 70 shown in FIG. 3), valve element 64 of control valve 52 may move to the default position, at which the flow of fluid entering or exiting cylinder 44 may be allowed, but highly restricted. This restriction of fluid flow into and out of cylinder 44 may function to slow extending and retracting movements of cylinder 44, resulting in slowed movements of seat 26 (i.e., increased stiffness of seat 26). The slowed movements of seat 26 may function to cushion seat 26 from excessive shock loading. In addition to providing some comfort and/or protection to the operator of machine 12 during the failure condition, the increased stiffness of seat 26 may also be felt by and thereby signal the operator of machine 12 that the failure condition exists, allowing the operator to manually address the situation. In other words, the increased stiffness of seat 26 that occurs during the failure condition may provide tactile feedback to the operator indicative of the condition. In some embodiments, during the loss of power failure condition, valve element 64 may move to reduce a cross-sectional flow area of passage 50 by (i.e., place a restriction on the flow within passage 50 of), in one example, about 90%.

Figure 4:
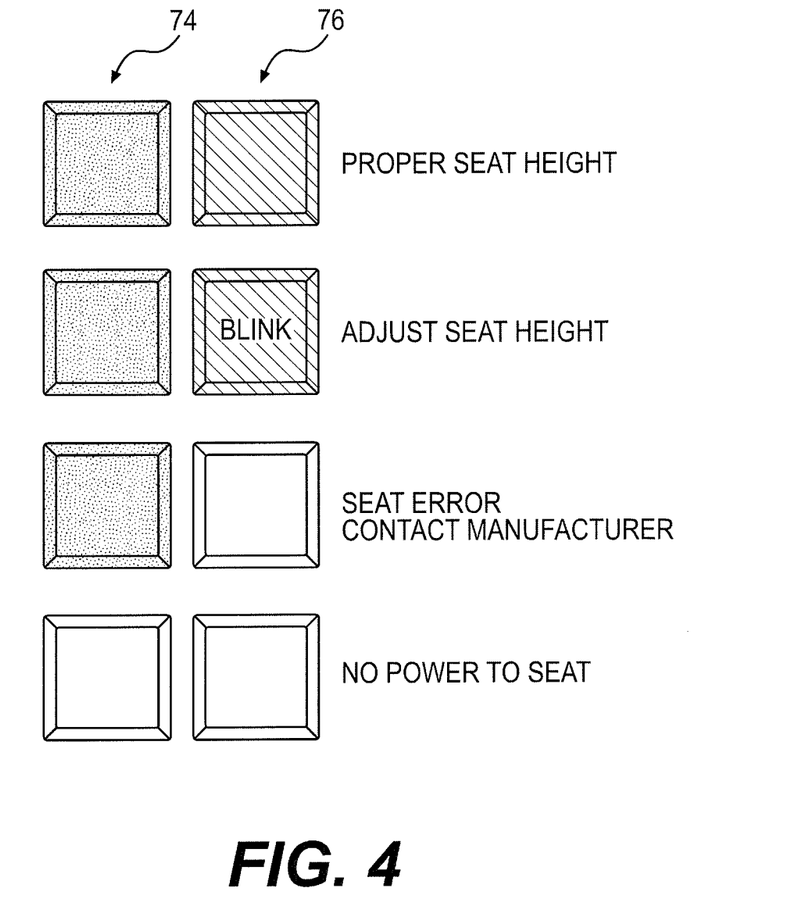
FIG. 4 is a diagrammatic illustration of an exemplary disclosed display associated with the suspension system of FIG. 3

In some embodiments, a display 72 may be associated with suspension system 30 and located within operator cabin 18 to alert the operator of machine 12 regarding a status of suspension system 30. An exemplary display 72 is illustrated in FIGS. 3 and 4, and includes two different indicators 74, 76. It should be noted, however, that any number of indicators may be included.

Indicator 74 may be associated with power source 70 and have at least two different states, while indicator 76 may be associated with seat 26 and have at least three different states. When indicator 74 is in its first state (shown in the first horizontal row in FIG. 4), indicator 74 may be illuminated with a solid color (e.g., blue), indicating that power source 70 is fully operational and providing a desired amount of power to suspension system 30. When indicator 74 is in its second state (shown in the last horizontal row in FIG. 4), indicator 74 may not be illuminated, indicating that power source 70 is non-operational (e.g., turned off or otherwise experiencing a failure) and is not providing power to suspension system 30.

When indicator 74 is in its second state, valve element 64 of control valve 52 should be in its default position. When indicator 76 is in its first state (shown in the first horizontal row in FIG. 4), indicator 76 may be illuminated with a solid color (e.g., green), indicating that a current height of seat 26 (as measured by seat sensor 66) is correct for the classified current operation of machine 12. When indicator 76 is in its second state (shown in the second row of FIG. 4), indicator 76 may be illuminated with a flashing color (e.g., flashing on and off in a green color), indicating that the height of seat 26 (as measured by seat sensor 66) is incorrect and should be manually adjusted or is being automatically adjusted for the classified current operation of machine 12. When indicator 76 is in its third state (shown in the third and fourth horizontal rows of FIG. 4), indicator 76 may not be illuminated, indicating a failure of seat 26 has occurred and/or providing instructions for the operator of machine 12.

Figure 5:
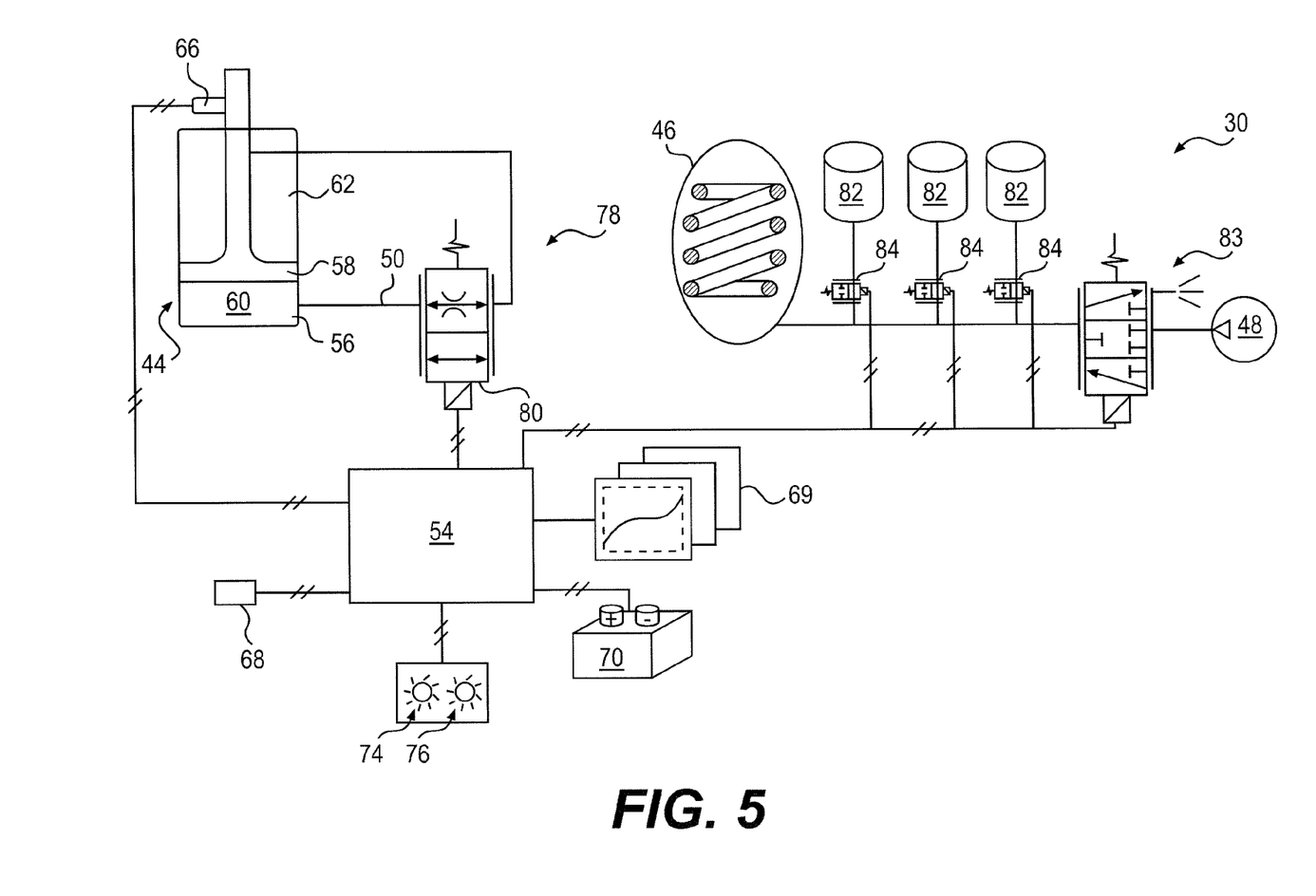
FIG. 5 is a schematic illustration of another exemplary disclosed suspension system that may be utilized in conjunction with the seat of FIG. 2.

FIG. 5 illustrates an alternative embodiment of suspension system 30. In this embodiment, cylinder 44 may be associated with a closed-loop circuit (i.e., head chamber 60 may be fluidly connectable with rod chamber 62 via a control valve 78 and passage 50), and spring 46 may be an air-type spring (e.g., an air bag) that is controllable together with or independent of cylinder 44 to affect suspension characteristics (e.g., height, response frequency, stiffness, etc.) of seat 26.

Control valve 78 may include a valve element 80 that is movable between at least two different positions, including a substantially unrestricted first position and a second position at which fluid flow through passage 50 is restricted by a desired amount. Valve element 80 may be movable to any position between the first and second positions to restrict the flow of fluid within passage 50 by any desired amount. As described above, the restriction of fluid flow through passage 50 may relate to an amount of resonant dampening and energy dissipation provided by cylinder 44 to seat 26. It should be noted that, in the configuration of FIG. 5, it may be possible for valve element 80 to complete block fluid flow through passage 50, if desired, thereby completely inhibiting movement of seat 26.

In the embodiment of FIG. 5, spring 46 may be selectively connected with source 48 and/or one or more secondary volumes 82 (e.g., fixed or variable volumes such as tanks or accumulators). In particular, spring 46, as an airbag, may be selectively filled with additional pressurized air from source 48 or drained of pressurized air via a control valve 83. In one example, control valve 83 may be a three-way valve movable to any position between a first position at which pressurized air flows from source 48 into spring 46, a second position at which fluid flow through control valve 83 is blocked, and a third position at which pressurized air from spring 46 is allowed to escape. Control valve 83 may be used to change a height of seat 26 and/or a stiffness of seat 26. Additionally or alternatively, spring 46 may be selectively connected with one or more secondary volumes 82 via independent control valves 84. Each of control valves 84 may be moved to any position between an unrestricted flow-passing position and a closed or flow-blocking position, thereby affecting a response frequency of spring 46.

Controller 54, in a manner similar to what is described above, may select particular control maps 69 based on classified operations of machine 12 to regulate operation of any one or more of control valves 78, 83, 84. That is, based on the classification of the current operation of machine 12 as one of the first, second, or third types of operations, controller 54 may select a corresponding control map 69 and reference signals from sensor 68 with the selected control map to generate commands issued to any one or more of control valves 78, 83, and 84. For example, controller 54 may reference the selected control map 69 to determine a command issued to control valve 78 that increases or decreases a restriction on fluid flow between head and rod chambers 60, 62, thereby varying an amount of resonant dampening provided by cylinder 44. Additionally or alternatively, controller 54 may reference the same or another selected control map 69 to determine a command issued to control valve 83, thereby increasing or decreasing an amount and/or pressure of air within spring 46. This change in the amount and/or pressure of air within spring 46 may affect a height of seat 26 and/or a force resisting motion of seat 26. Further, controller 54 may reference control map 69 to determine a command issued to one or more of control valves 84, thereby increasing or decreasing a volume of air in communication with spring 46. This change in air volume may affect a response frequency of seat 26.

INDUSTRIAL APPLICABILITY

The disclosed suspension system may be applicable to any mobile machine where substantial isolation from machine and/or environmentally-induced vibrations and shock loading is desired, while still providing some control over how the isolation is implemented. Specifically, the disclosed suspension system may provide for isolation from vibration and shock loading through the use of cylinder 44 and spring 46 attached at the bottom side of seat 26. Pressurized fluid may be selectively directed into cylinder 44 and/or spring, or selectively directed out of cylinder 44 and/or spring 46 at different times, at different rates, and/or at different pressures to provide control over the level of dampening provided. Fluid flow rates and pressures may be adjusted through the use of control valve 52 and, more specifically, through the controlled movement of valve element 64 between its more-restrictive position and its less-restrictive second position.

During a failure condition, for example during a condition where power to suspension system 30 is unexpectedly disrupted, suspension system 30 may enter a fail-safe mode of operation. Specifically, when power to suspension system 30 is lost, valve element 64 may be biased to its default position. And when in its default position, valve element 64 may increase the restriction placed on the flow of fluid in passage 50 (e.g., up to about 90%), thereby slowing the motion of seat 26. Although stiffness of seat 26 may be increased at this time, fluid flow through passage 50 may still be allowed, thereby still allowing for some motion of seat 26 (i.e., seat 26 may not be completely rigid at this time). In one embodiment, every time seat 26 moves away from floor 28 during the failure condition, some fluid may still be allowed into head chamber 60 and, every time seat 26 moves towards floor 28, some fluid may still be allowed out of head chamber 60. This fail-safe functionality may help cushion the operator and protect the operator from shock-loading, while also providing the operator with an indication of the failure condition. Display 72 may provide additional information regarding functionality of suspension system 30 during the failure condition. It will be apparent to those skilled in the art that various modifications and variations can be made to the suspension system of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A suspension system for a mobile machine, comprising:
a seat operatively connected to a cabin floor of the mobile machine;
a cylinder connected between the seat and the cabin floor;
a spring associated with the cylinder;
a valve configured to regulate fluid flow into and out of the cylinder, wherein the valve includes a valve element movable from a first position at which the fluid flow into and out of the cylinder is restricted by an amount that still allows fluid flow through the valve, to a second position at which the fluid flow is substantially unrestricted by the valve element, and wherein the valve element is biased toward a default position between the first and second positions and moveable to any position between the first and second positions; and
a controller in communication with the valve, the controller being configured to:
detect a failure condition of the suspension system; and
in response to detection of the failure condition, cause the valve element to move to the default position at which fluid flow into and out of the cylinder is restricted by an amount that is less than the amount of restriction to fluid flow of the first position but more than the substantially unrestricted fluid flow of the second position.

2. The suspension system of claim 1, wherein the failure condition is associated with a loss of power to the suspension system.

3. The suspension system of claim 1, wherein the amount of restriction is about 90%.

4. The suspension system of claim 1, further including a display configured to display status information regarding the suspension system to an operator of the mobile machine.

5. The suspension system of claim 4, wherein the display includes at least one indicator having at least two states associated with the status of the suspension system.

6. A suspension system for a mobile machine, comprising:
a seat operatively connected to a cabin floor of the mobile machine;
a cylinder connected between the seat and the cabin floor;
a spring associated with the cylinder;
at least one valve configured to regulate fluid flow into and out of the cylinder;
a controller in communication with the at least one valve, the controller being configured to:
detect a failure condition of the suspension system; and
in response to detection of the failure condition, cause the at least one valve to move to a default position at which fluid flow into and out of the cylinder is restricted by an amount that still allows fluid flow through the at least one valve; and
a display configured to display status information regarding the suspension system to an operator of the mobile machine, wherein the display includes at least one indicator having at least two states associated with the status of the suspension system, and wherein the at least one indicator includes:
a first indicator associated with a power supply of the suspension system; and
a second indicator associated with the seat.

7. The suspension system of claim 6, wherein:
the first indicator has an operational state and a non-operational state; and
the second indicator has an operational state, a non-operational state, and a seat adjusting state.

8. The suspension system of claim 7, wherein the seat adjusting state alerts the operator that a height of the seat is properly adjusted or needs to be adjusted.

9. The suspension system of claim 8, wherein the seat adjusting state is activated based on a current operation of the mobile machine.

10. A seat dampening method for a mobile machine, comprising:
pressurizing fluid;
selectively directing pressurized fluid into and out of a cylinder associated with an operator seat to dampen movement of the operator seat;
detecting a failure condition of the mobile machine;
restricting fluid flow into and out of the cylinder by an amount that still allows fluid flow into and out of the cylinder during the failure condition; and
displaying status information regarding dampening of the operator seat to an operator of the mobile machine, wherein displaying status information includes:
changing a state of a first indicator associated with a power supply of the mobile machine; and
changing a state of a second indicator associated with the operator seat.

11. The seat dampening method of claim 10, wherein the failure condition is associated with a loss of power of the mobile machine.

12. The seat dampening method of claim 10, wherein restricting fluid flow into and out of the cylinder by an amount includes restricting fluid flow into and out of the cylinder by an amount of about 90%.

13. The seat dampening method of claim 10, wherein:
the first indicator has an operational state and a non-operational state; and
the second indicator has an operational state, a non-operational state, and a seat adjusting state.

14. The seat dampening method of claim 13, wherein the seat adjusting state alerts the operator that a height of the operator seat is current being adjusted or needs to be adjusted.

15. The seat dampening method of claim 14, wherein the seat adjusting state is activated based on a current operation of the mobile machine.

* * * * *